US007464156B2

(12) United States Patent
Amir et al.

(10) Patent No.: US 7,464,156 B2
(45) Date of Patent: Dec. 9, 2008

(54) LOAD BALANCING METHOD FOR EXCHANGING DATA BETWEEN MULTIPLE HOSTS AND STORAGE ENTITIES, IN IP BASED STORAGE AREA NETWORK

(75) Inventors: Shai Amir, Raanana (IL); Yaron Klein, Tel-Aviv (IL)

(73) Assignee: Sanrad, Ltd., Tel Aviv (IL)

( * ) Notice: Subject to any disclaimer, the term of this patent is extended or adjusted under 35 U.S.C. 154(b) by 569 days.

(21) Appl. No.: 10/488,491

(22) PCT Filed: Sep. 6, 2002

(86) PCT No.: PCT/US02/28417

§ 371 (c)(1),
(2), (4) Date: Aug. 16, 2004

(87) PCT Pub. No.: WO03/023640

PCT Pub. Date: Mar. 20, 2003

(65) Prior Publication Data

US 2005/0010682 A1    Jan. 13, 2005

Related U.S. Application Data

(60) Provisional application No. 60/317,860, filed on Sep. 7, 2001.

(51) Int. Cl.
*G06F 15/16* (2006.01)
*G06F 9/46* (2006.01)
*G06F 15/173* (2006.01)

(52) U.S. Cl. .................. 709/224; 709/200; 709/230; 709/238

(58) Field of Classification Search .................. 709/201, 709/223, 220, 230, 238, 225; 370/35, 254, 370/389
See application file for complete search history.

(56) References Cited

U.S. PATENT DOCUMENTS

| 5,564,021 | A  |   | 10/1996 | Qiu et al.        |         |
|-----------|----|---|---------|-------------------|---------|
| 5,774,660 | A  | * | 6/1998  | Brendel et al.    | 709/201 |
| 5,941,972 | A  | * | 8/1999  | Hoese et al.      | 710/315 |
| 5,999,525 | A  | * | 12/1999 | Krishnaswamy et al.| 370/352 |
| 6,175,564 | B1 |   | 1/2001  | Miloslavsky       |         |
| 6,185,619 | B1 | * | 2/2001  | Joffe et al.      | 709/229 |
| 6,262,976 | B1 | * | 7/2001  | McNamara          | 370/254 |

(Continued)

OTHER PUBLICATIONS

"Working Draft: Information Technology- Serial Storage Architecture- SCSI-2 Protocol (SSA-S2P)" Revision 7b, Jul. 22, 1996.

(Continued)

*Primary Examiner*—Jeffrey Pwu
*Assistant Examiner*—Gerald Smarth
(74) *Attorney, Agent, or Firm*—Myers Wolin, LLC

(57) ABSTRACT

The present invention achieves load balancing of activities on storage entities, operating in a storage area network (SAN) by assignment of address to each storage entity. The storage traffic is monitored and statistics are accumulated over an interval and then used to obtain the traffic pattern of each host-storage entity link. A statistical analysis is used to determine the optimal routing map from hosts to storage entity. Other heuristics including genetic algorithms many also be used. This mapping is set on the network by assigning the entities' addresses to the storage gateways, thus does not impose any process on the hosts or the disks.

10 Claims, 5 Drawing Sheets

U.S. PATENT DOCUMENTS

| | | | |
|---|---|---|---|
| 6,400,730 B1 * | 6/2002 | Latif et al. | 370/466 |
| 6,757,753 B1 * | 6/2004 | DeKoning et al. | 710/38 |
| 7,130,939 B2 * | 10/2006 | Sumiyoshi et al. | 710/71 |
| 2001/0054131 A1 * | 12/2001 | Alvarez et al. | 711/105 |
| 2002/0009079 A1 * | 1/2002 | Jungck et al. | 370/389 |
| 2002/0145981 A1 * | 10/2002 | Klinker et al. | 370/244 |
| 2004/0078419 A1 * | 4/2004 | Ferrari et al. | 709/201 |

OTHER PUBLICATIONS

Julian Satran, et al. "iSCSI" Internet Draft, draft-ietf-ips-iscsi-13.txt, Jun. 14, 2002.

* cited by examiner

LOAD BALANCING METHOD FOR EXCHANGING DATA BETWEEN MULTIPLE HOSTS AND STORAGE ENTITIES, IN IP BASED STORAGE AREA NETWORK

RELATED APPLICATIONS

This application claims the benefit under 35 U.S.C 119(e) from U.S. Provisional Application No. 60/317,860 filed Sep. 7, 2001.

BACKGROUND OF THE INVENTION

1. Field of Invention

The invention relates to the load balancing of traffic in an IP based Storage Area Network (SAN). More particularly, the present invention relates to dynamic assignment of IP addresses to storage end points according to network traffic.

2. Description of the Related Art

The Small Computer Systems Interface ("SCSI") is a popular family of protocols for communicating with I/O devices, in particular storage devices. More to the point, SCSI is the basic protocol for I/O operations between computers and storage subsystems. The SCSI protocol is, in essence, a point-to-point protocol.

Another popular protocol is the Transmission Control Protocol/Internet Protocol ("TCP/IP"). TCP/IP is the basic set of communication protocols for general data exchange between computers connected on a communication network. This is a common protocol used to communicate via the Internet.

Currently there is a convergence between the two protocols, that is, SCSI and TCP/IP. In particular, computers that communicate with their subsystems via SCSI are now tending to be interconnected via the Internet and utilizing TCP/IP to communicate with each other.

In view of this convergence, a standard (ietf draft) has been proposed for implementing SCSI over TCP. The currently proposed standard "draft-ietf-ips-iSCSI-13.txt" is available at http://www.ietf.org/internet-rafts/draft-ietf-ips-iscsi-13.txt (Satran. et. al IPS Internet Draft-ietf-ips-iscsi-15.txt [online], [retrieved on Sep. 5, 2002]. Retrieved from the Internet<URL:http://www.ietf.org/internet-drafts/draft-ietf-ips-iscsi-15.txt>(herein expressly incorporated by reference).

In view of this convergence, a standard (ietf draft) has been proposed for implementing SCSI over TCP.

The ietf draft aims to be fully compliant with the requirements laid out in the SCSI Architecture Model-2 Document (Project Leader Charles Monia, Technical Editor John P. Scheible Working Draft. This SCSI standard provides for transmitting SCSI commands between SCSI devices, over TCP/IP connections. Conventionally, SCSI devices that communicate with each other must be connected via the same SCSI bus. The proposed ietf draft permits SCSI devices, which are not connected via the same SCSI bus to communicate with each other via the Internet, utilizing the TCP/IP protocol. According to the ietf draft, SCSI devices that are separated from one another even by great distances may communicate with each other. The ietf draft seeks to describe an implementation of SCSI that operates on top of TCP as the transport protocol.

The following briefly defines some SCSI conceptual terms. The end point of a typical SCSI command is a "logical unit" (LUN). Logical units include, for example, hard drives, tape drives, CD and DVD drives, printers and processors. A collection of logical units is referred to as a "target" and is directly addressable on the network. In a client-server model, the target corresponds to the server. An "initiator" creates and sends SCSI commands to the target. In the client-server model, the initiator corresponds to the client.

A typical SCSI command results in a command phase, data phase and a response phase. In the data phase, information travels either from the initiator to the target (for example, a WRITE command), or from the target to the initiator (for example, a READ command). In the response phase, the target returns the final status of the operation, including any errors. A response signal, is the end of a typical SCSI command.

The ietf draft defines a method of encapsulating those SCSI commands, SCSI Data and SCSI Responses over TCP/IP. It also defines methods to ensure the reliability of the transfer from the initiator to the target. This includes commands' numbering, commands' tagging and acknowledgment. Also it provides means of securing data and authenticating initiators and targets to each other.

A storage gateway is a device that connects IP networks and Storage Networks (e.g., parallel SCSI or Fibre Channel). On one side it connects to initiators via an IP network and on the other side it connects to targets comprising storage devices via for example, the storage bus. It receives encapsulated SCSI Commands and/or data from the initiators, decapsulates them and transfers the raw SCSI command/data to the storage device. After completion of the command, it sends back to the initiator a status signal and/or data over the IP network.

A storage gateway can include more features than simple connectivity. Those can include Virtualization, disk concatenation, striping, mirroring and so on. The exposed LUNs can be any function of the physical LUNs. The present invention is independent of those features.

BRIEF SUMMARY OF THE INVENTION

It is the intent of this invention to provide a method, system and/or means for balancing traffic on a plurality of storage entities in a storage area network. Some examples of storage entities include physical disks, virtual disks, clusters of physical disks, clusters of virtual disks and/or combinations of virtual and physical disks. Examples of a storage area network include an IP based network or a MAC layer based network.

FIG. 1 is an illustration of a SAN over IP. The host servers (10) in the upper part are the initiators in the client-server model. Any number of host servers may be included, for example, as shown in FIG. 1 Host 1 to Host n. The storage endpoints (30) in the lower part are the target LUNs. FIG. 1 shows the LUNs as Storage 1 to Storage m as an example. However the LUNs may include, for example, hard drives, tape drives, CD and DVD drives, printers and processors.

An intermediate layer is shown in FIG. 1 and may include a combination of, for example, Gateways (20). As illustrated in FIG. 1 any combination of Gateways (20) may be included. These are shown for convenience as Gateway 1 to Gateway k. The topology in this SAN over IP of FIG. 1 has any-to-any connectivity in the storage layer (35). The any-to-any connectivity can connect to any storage device.

According to an embodiment of the invention, the mapping is set in the network by assigning an IP address of each storage entity. The IP address may be unique for each storage entity.

According to another embodiment of the invention, each gateway listens on the IP addresses of the storage entities it is responsible for. There is no intersection of IP addresses between the gateways and each storage entity has one gateway that is responsible for it. Thus a one-to-one routing map is implemented.

According to another embodiment of the invention, a statistical server accumulates and processes statistics of data traffic in the network from each host—storage entity route over a time interval.

According to another embodiment of the invention, a statistical server is calculating the optimal routing map of each host—storage entity. The optimal routing map is the solution to an optimization problem, where each solution (mapping) results a cost function combined from the traffic variance (balance) and minimal changes from the previous mapping.

According to another embodiment of the invention, the new routing map is set to the gateways. The server sets to each gateway the IP addresses it should listen via.

The present invention proposes to take advantage of a unique addressing mechanism, to simplify the logic to a great extent reducing bottlenecks in the traffic and to balance traffic loads in the network. Thus, provide faster access and higher throughput from servers to the storage devices. Examples of a unique addressing mechanism may include IP, MAC but is not limited to these schemes.

BRIEF DESCRIPTION OF THE DRAWINGS

The above-mentioned and other advantages and features of the present invention will become more readily apparent from the following detailed description and the accompanying drawings, in which.

DETAILED DESCRIPTION OF THE INVENTION

The following detailed description of the preferred embodiment includes many specific details. The inclusion of such details is for the purpose of illustration only and should not be understood to limit the invention.

Figure 1:
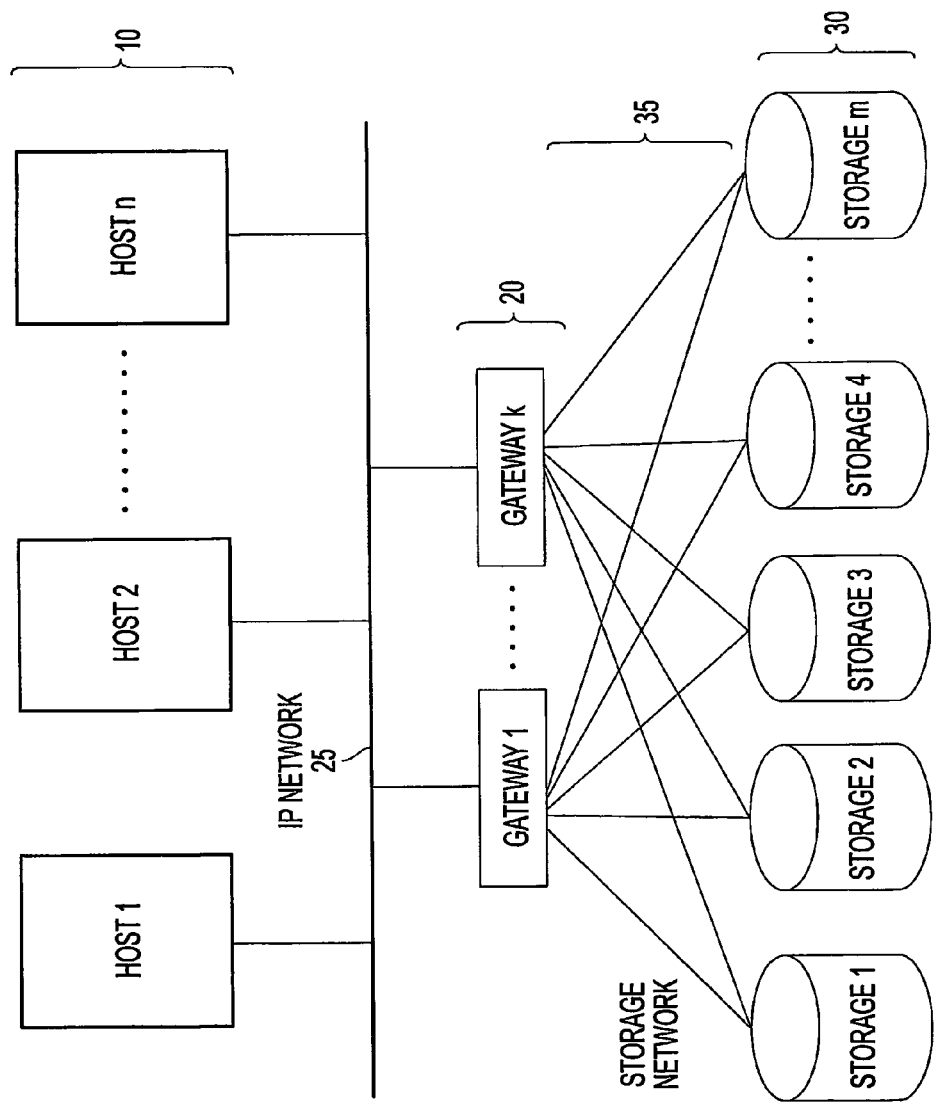
FIG. 1 is a scheme of a system topology. The scheme describes an IP network (25) with n host computers (10) and k gateways (20). The gateways (20) are connected with an any-to-any connection (35) to m storage entities (30)
Figure 2:
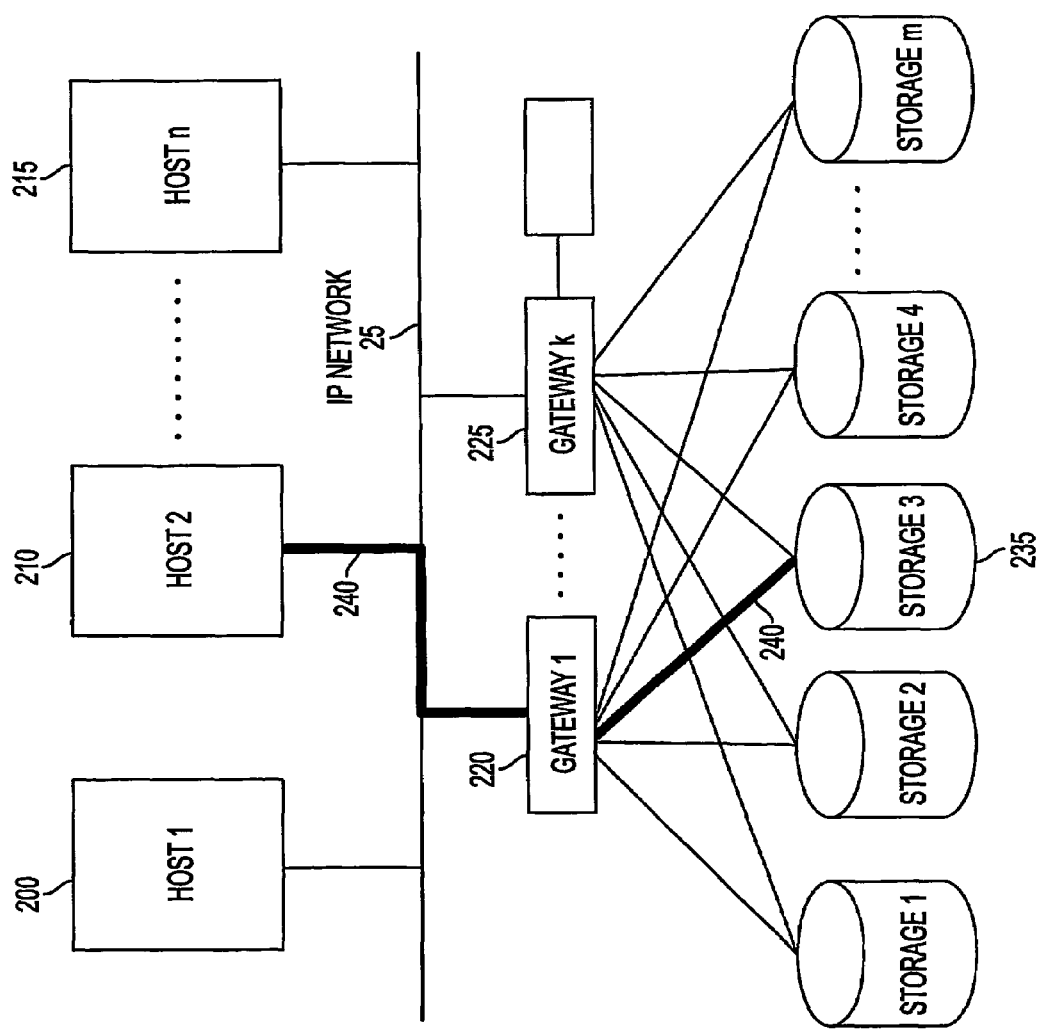
FIG. 2 is an example of a particular routing. It shows the connectivity (240) from Host 2 (210) to storage entity 3 (235) via gateway 1 (220)

FIG. 1 is an embodiment of n host servers (initiators) (10) connected to k Gateways (20) via IP network (25). The k gateways (20) are connected to m storage devices (30) with an any-to-any connectivity (35). Each host can reach each disk via each one of the gateways (20).

For purposes of illustration for a particular embodiment, the TCP/IP backbone could be part of the global Internet, an Intranet, or any network utilizing TCP/IP. It should be noted that the invention can be applied to any system utilizing SCSI buses which are interconnected via a TCP/IP protocol. Thus, the invention could easily be implemented in a variety of network architectures.

In this example a configuration will be used in the following discussion of the method and system according to the invention. Reference is made to FIG. 1, in connection with describing the behavior of an example network.

The goal of the invention is to create a routine mapping from each host server (10) to each disk (30). By creating this mapping the gateway (20) is set through which each host computer (10) connects to each disk (30), such that the traffic in the gateways (20) on the storage sub-network side (20) (35) (30) is balanced.

A mapping of each host computer (10) to each disk (30) is of the form of a matrix:

$$\text{map}\left((disk_1 \ disk_2 \ \wedge \ disk_m), \begin{pmatrix} host_1 \\ host_2 \\ M \\ host_n \end{pmatrix}\right) =$$

$$\begin{pmatrix} Gateway_{1,1} & Gateway_{1,2} & \wedge & Gateway_{1,m} \\ Gateway_{2,1} & Gateway_{2,2} & \wedge & Gateway_{2,m} \\ M & M & O & M \\ Gateway_{n,1} & Gateway_{n,2} & \wedge & Gateway_{n,m} \end{pmatrix}$$

where $$Gateway_{i,j} \in \{gateway_1, K, gateway_k\}$$

is a gateway that connects from $host_i$ to $disk_j$.

Figure 3:
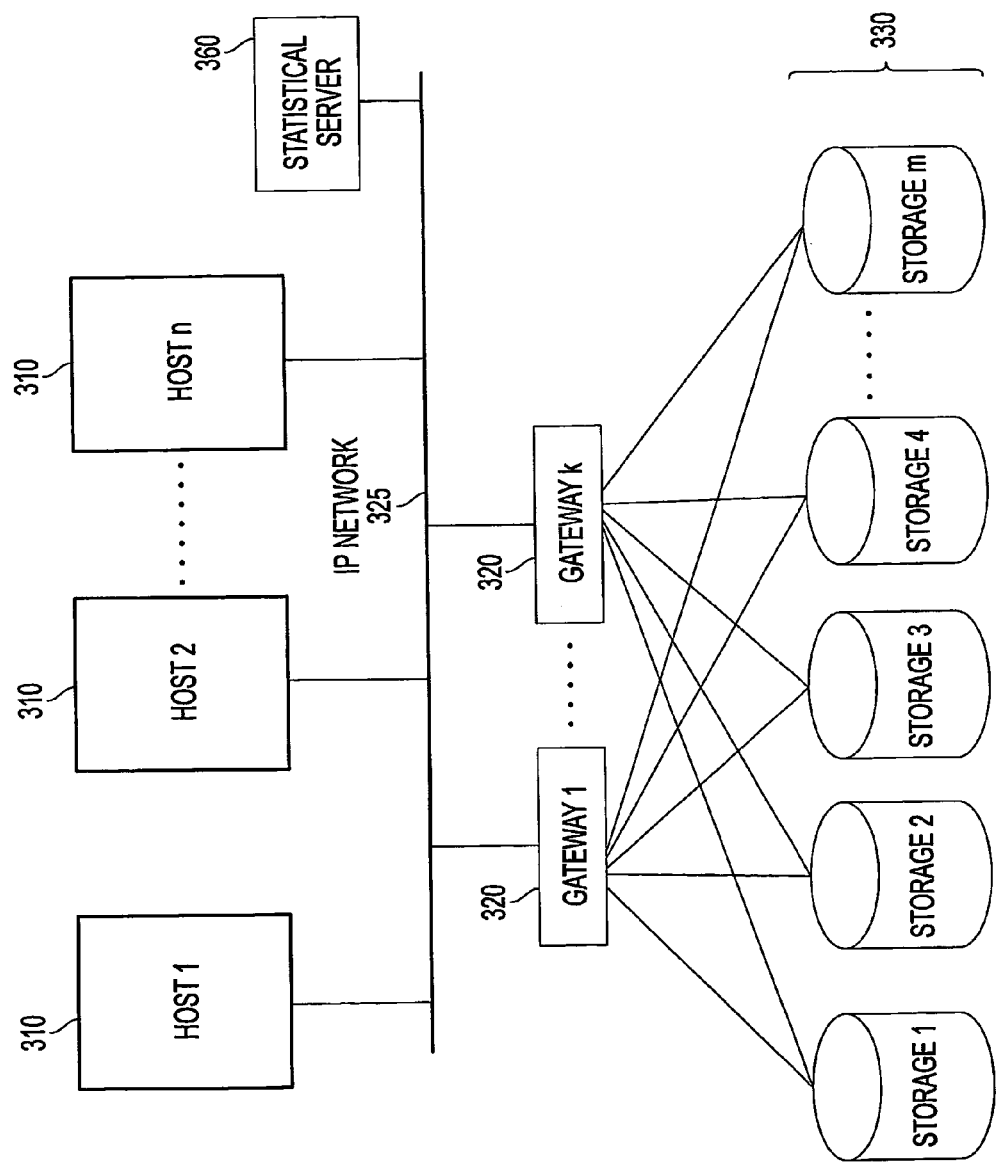
FIG. 3 is a scheme of a system topology with the addition of the statistics' server (360). The scheme describes an IP network (325) that includes n host computers (310) and k gateways (320). The gateways (320) are connected with an any-to-any connection to m storage entities (330)

The $traffic_{i,j}$ from each host computer to a disk is measured in a time interval, is assembled. This assembling may be performed by a specific statistic server (350) as shown in FIG. 3 or a priory and entered into a matrix of the form:

$$\text{traffic}\left((disk_1 \ disk_2 \ \wedge \ disk_m), \begin{pmatrix} host_1 \\ host_2 \\ M \\ host_n \end{pmatrix}\right) =$$

$$\begin{pmatrix} traffic_{1,1} & traffic_{1,2} & \wedge & traffic_{1,m} \\ traffic_{2,1} & traffic_{2,2} & \wedge & traffic_{2,m} \\ M & M & O & M \\ traffic_{n,1} & traffic_{n,2} & \wedge & traffic_{n,m} \end{pmatrix}$$

Where $traffic_{i,j}$ is the amount of data transferred between $host_i$ and $disk_j$ in the time interval.

$$Gtraffic = \left((disk_1 \ disk_2 \ \wedge \ disk_m), \begin{pmatrix} Gateway_1 \\ Gateway_2 \\ M \\ Gateway_k \end{pmatrix}\right) =$$

$$\begin{pmatrix} Gtraffic_{1,1} & Gtraffic_{1,2} & \wedge & Gtraffic_{1,m} \\ Gtraffic_{2,1} & Gtraffic_{2,2} & \wedge & Gtraffic_{2,m} \\ M & M & O & M \\ Gtraffic_{k,1} & Gtraffic_{k,2} & \wedge & Gtraffic_{k,m} \end{pmatrix}$$

where $Gtraffic_{i,j}$ is the traffic from $gateway_l$ and $disk_j$ such that:

$$Gtraffic_{i,j} = Gtraffic(Gateway_i, disk_j) = \sum_{Gateway_{i,j}=gateway_l} traffic_{i,j}$$

k is:

$$GatewayTraffic = \begin{pmatrix} Gateffic_1 \\ Gateffic_2 \\ M \\ Gateffic_k \end{pmatrix} = \begin{pmatrix} \sum_{i=1}^{m} Gtraffic_{1,i} \\ \sum_{i=1}^{m} Gtraffic_{2,i} \\ M \\ \sum_{i=1}^{m} Gtraffic_{k,i} \end{pmatrix}$$

The optimal mapping is a map matrix that will minimize the cost function:

$$\min(w_{var} \cdot var(GatewayTraffic) + w_{change} \cdot change)$$

where var is the variance, change is the number of changes from the previous mapping and $w_{var}$ and $w_{change}$ are the weights assigned to the variance and changes respectively.

The solution for the optimization problem assigns each route from host i (10) to storage device j (30) $Gateway_{i,j}$ to a physical gateway l (20), i.e $$Gateway_{i,j} \rightarrow gateway_l, 1 \leq i \leq j \leq m, 1 \leq l \leq k$$

The possible mappings combinations are $k^{m*n}$, thus the complexity of the optimization problem is $O(map)=k^{m*n}$. where k is the number of gateways (20), m is the number of disks (30) and n is the number of host computers (10).

In networks, where O(map) is computationally feasible, all alternatives are checked (cost function is calculated) and the best mapping is selected. The feasibility may be related to the size of the network or the availability of computational power, for example. In addition to computing all alternatives, heuristic algorithms can be applied such as simulated annealing, greedy algorithms, economic optimizations, genetic algorithms or tabular search.

If a Storage Name Server (SNS) resides in the network, it contains the mapping. Each host computer (10) queries the IP Network periodically for the gateway (20) that connects it to the desired disk (30).

Each gateway (20) listens on the corresponding IP addresses of the routes it is assigned to. That is, if host (10) i (1<=i<=n) is routed to storage entity (30) j (1<=j<=m) via gateway (20) l (1=l<=k), gateway l listens on the IP address of storage entity j. Thus the mapping is implemented transparently for the host computers (10) and the disk (30).

In an embodiment of this method and system for balancing traffic on a plurality of host storage entities with selectively optimized routing comprising physical disks, virtual disks, clusters of physical disks, clusters of virtual disks as well as combinations of virtual and physical disks in an IP based storage area network includes constructing a network that has at least one host of several hosts, at least one of several of a storage entities, and at least one of several storage gateways;

In the embodiment a unique gateway is selected for connecting between the host entity to the storage entity. Routing occurs via a host-gateway-storage entity. Further, assigning an unique IP address to each of at least one of several storage entities such that said host recognizes a storage entity by IP address. Then accumulating at least one of several of a statistical reading of data traffic in said network from each host-gateway-storage entity route over a time interval by a statistical server. The statistical server may process the statistical reading. This may be utilized in calculating an optimal routing map of each of the host gateway-storage-entity.

The optimal routing map includes a an optimization function where each of at least one of several mapping solutions results from a cost function combined from a traffic variance balance and a reading of minimal changes for an a priori mapping;

Further determining at least one of several of a mapping setting in the network by assigning the unique IP address of each host-gateway-storage entity to a storage gateway with each of one of several gateways listening for new IP addresses set to each gateway; and implementing an optimized routing mapping.

Also in another embodiment the accumulating of statistics is done a-priory by at least a network manager.

In a further embodiment the IP addresses assignment is implemented with a Storage Name Server configuration. Also the assignments may be determined by a host querying the server periodically for the IP address of the storage entity and granting the IP address according to the routing map.

In a further embodiment the routing map is implemented by the storage gateways with redirections of the storage transaction commands.

In a further embodiment the network is constructed from at least one of several hosts, several proxies and several IP storage endpoints comprised of at least one of a storage entity with IP interface or a storage gateway.

The optimal routing may also comprise an optimization determined by a fitness function including at least one of a genetic algorithm; a simulated annealing or a tabular search.

Figure 4:
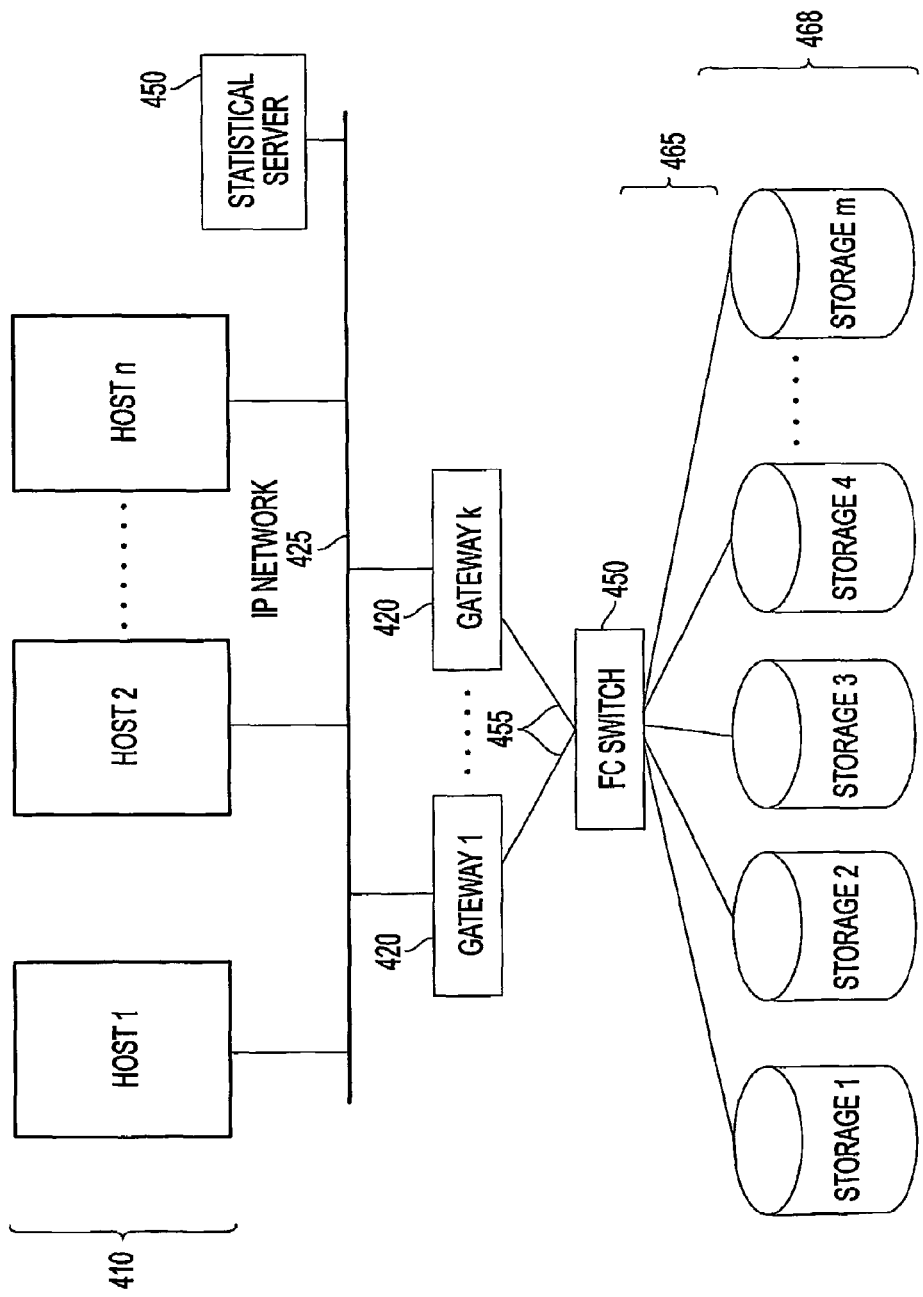
FIG. 4 is a scheme of another topology. The topology includes an IP network (425) connected with n host computers (410) and k gateways (420). The gateways (420) are connected (455) to the storage entities (468) in a Fibre Channel network (465) routed by FC switch or FC hub (450)

FIG. 4 shows an embodiment of another topology. An IP network (425) is connected with n host computers (410) and k gateways (420). The gateways (420) are connected (455) to the storage entities (468) in a Fibre Channel network (465) routed by FC switch or FC hub (450). The storage entities (468) may include, for example, physical disks, virtual disks, clusters of physical disks, clusters of virtual disks as well as combinations of virtual and physical disks. The system implements selectively optimized routing.

Figure 5:
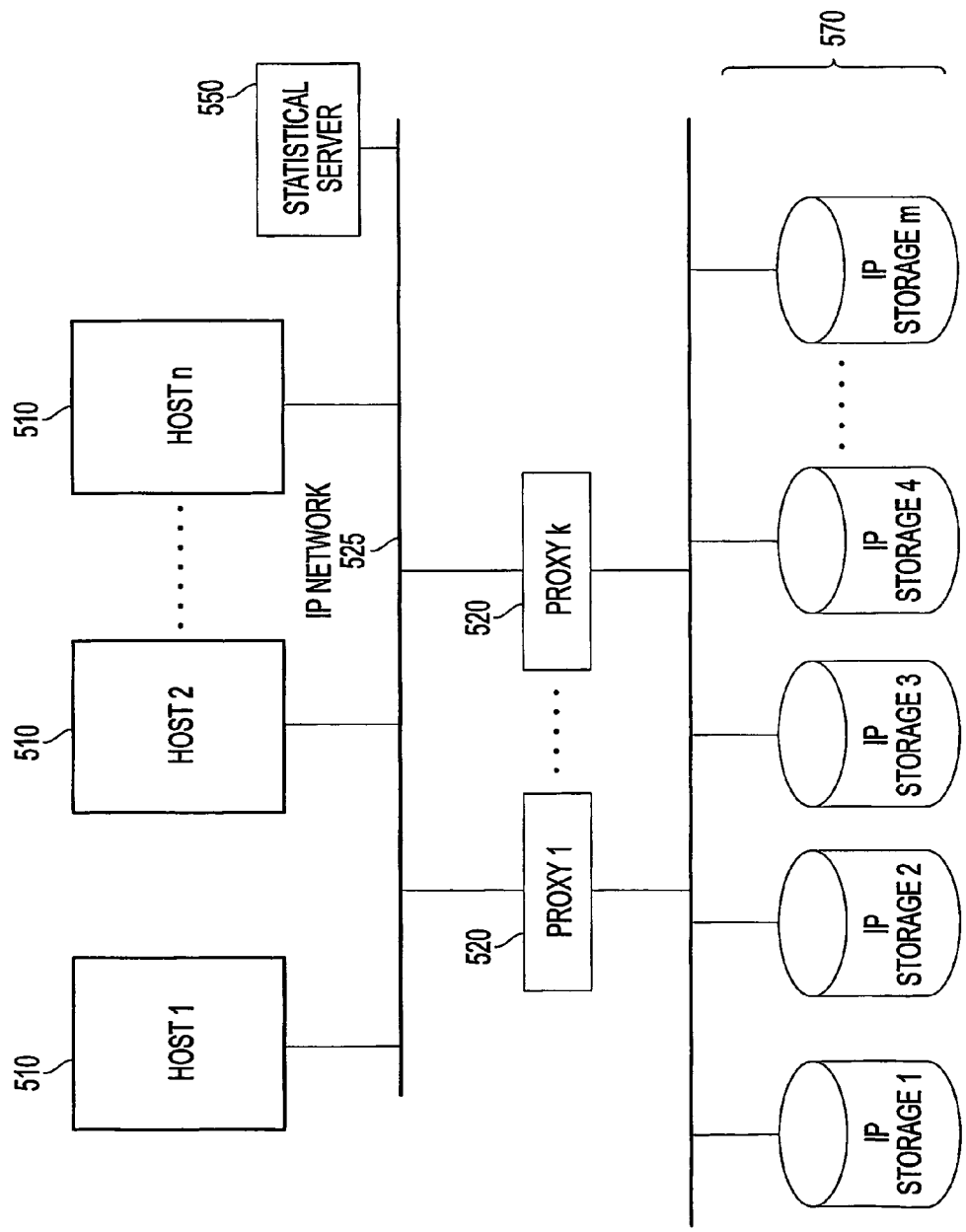
FIG. 5 is a scheme of a topology containing n host computers (510), k proxies (520) and m storage endpoints with IP interface (570).

This system is constructed to include at least one of several gateways (420); at least one of several storage databases; an IP network (425); at least one of several statistical servers (450); at least one of several FC switches or hubs (450) in any combination. Also included as shown in FIG. 5 are k proxies (520), thus the configuration may also include at least one of several proxies; and an interconnection optimally routed to at least one of several storage databases (468 FIG. 4). The storage databases may further include IP enabled storage databases (570 FIG. 5).

In another embodiment a system for balancing traffic on a plurality of host storage entities with selectively optimized routing in an IP based storage area network also includes any combination of physical disks, virtual disks, clusters of physical disks, clusters of virtual disks as well as combinations of virtual and physical disks.

This system further includes at least one of several hosts linking to an IP network, a statistical service, at least one of several gateways, interconnecting at least one of at least one FC switch an interconnection to optimally routed to at least one served of several storage databases.

In this embodiment the storage databases may further include IP enabled storage databases; an IP network; at least one of several statistical servers; at least one of several FC switches; at least one of several FC hubs; at least one of several proxies; and an interconnection optimally routed to at least one of several storage databases; said storage databases further comprising IP enabled storage databases.

While this invention has been described in conjunction with the specific embodiments outlined above, many alternatives, modifications and variations will be apparent to those skilled in the art. Accordingly, the preferred embodiments of the invention is set forth above are intended to be illustrative, and not limiting. Various changes may be made without parting from the spirit and the scope of the invention as defined in the following claims.

What is claimed is:

1. A method for balancing storage traffic in a storage area network (SAN), including at least a plurality of host computers, at least one storage gateway, and a plurality of storage entities, wherein the host computers are coupled to the storage gateway through a network and the storage entities are coupled to the storage gateway through a communication means, said method comprising:

accumulating, over a time interval, statistical readings on the storage traffic for all routes in the SAN, wherein a route is established between each a host computer and a storage entity through the at least one gateway;

determining a routing map using the statistical readings and a cost function, wherein the cost function is min ($w_{variance}$*variance(GatewayTraffic)+$w_{change}$*change), where the change value is a number of changes from a previous routing map, $w_{variance}$ is a weight assigned to the variance, the $W_{change}$ is a weight assigned to the change value, and the GatewayTraffic is the statistical readings on the storage traffic; said cost function is computed for all combinations of routes in the SAN; and using the routing map to assign new routes between the plurality of host computers and the plurality of storage entities through the at least one storage gateway;

whereby the new routes allow to balance the storage traffic in the SAN.

2. The method of claim 1, wherein the routes for which statistical readings are accumulated are pre-assigned.

3. The method of claim 2, wherein the pre-assignment of routes is performed a-priori by a network manager.

4. The method of claim 2, wherein the pre-assignment of routes is performed by the steps of:

selecting a unique storage gateway from the at least one storage gateway for connecting between a host computer and a storage entity; and assigning an Internet protocol (IP) address to the storage entity such that the host computer recognizes the storage entity by the IP address.

5. The method of claim 1, wherein the routing map includes a set of routes that minimizes the cost function.

6. The method of claim 1, wherein the routing map may be computed using a heuristic algorithm including at least one of: a simulated annealing algorithm, a greedy algorithm, a economic optimization algorithm, and a search algorithm.

7. The method of claim 1, wherein the assignment of new routes is performed by a storage name server (SNS).

8. The method of claim 7, further comprising:

periodically querying, by a host computer, the SNS for an IP address of a storage entity; and granting the IP address of the storage entity to the host computer according to the routing map.

9. The method of claim 1, wherein the network is an IP network.

10. The method of claim 1, wherein the storage entity is at least one of: a physical disk, a virtual disk, a cluster of physical disks, a cluster of virtual disks, and a cluster of virtual disks and physical disks.

* * * * *